United States Patent [15] 3,701,863

Eisenlohr et al. [45] Oct. 31, 1972

[54] SWITCHING NETWORK TEST CIRCUIT

[72] Inventors: Dieter Moritz Paul Eisenlohr, Middletown, N.J.; Roderic Romero, Boulder, Colo.

[73] Assignee: Bell Telephone Laboratories, Incorporated, Murray Hill, N.J.

[22] Filed: Dec. 11, 1970

[21] Appl. No.: 97,200

[52] U.S. Cl. ..........................................179/175.2 R
[51] Int. Cl. ..........................................H04m 3/26
[58] Field of Search....................179/175.2 R, 18 AB

[56] References Cited

UNITED STATES PATENTS 3,497,640 2/1970 Basset et al. ........179/175.2 R
3,443,034 5/1969 Schonemeyer et al.........179/18 AB

*Primary Examiner*—Kathleen H. Claffy
*Assistant Examiner*—Douglas W. Olms
*Attorney*—R. J. Guenther and James Warren Falk

[57] ABSTRACT

A switching system is disclosed having improved facilities for extending test calls to preselected trunk side circuits. A circuit that is to receive a test call is reserved by operating its make busy switch. This immediately makes the circuit unavailable for the reception of normal type traffic and permits it to complete the serving of any call on which it is currently engaged. A subsequently placed test call does not have to compete with other traffic and is assured of obtaining a connection to the reserved circuit.

7 Claims, 10 Drawing Figures

INVENTORS D.M.P. EISENLOHR
R. ROMERO
BY
Donald M. Duft
ATTORNEY

SWITCHING NETWORK TEST CIRCUIT

BACKGROUND OF THE INVENTION

This invention relates to a switching system, and in particular to a switching system having improved maintenance facilities. The invention further relates to a switching system having improved facilities for extending calls from a test desk to any preselected traffic circuit.

Switching systems are known in which calls from a test desk or the like may be completed to preselected traffic circuits such as registers, trunk circuits, etc. In common control type systems, such calls are typically completed by (1) operating a make-busy switch or jack associated with the traffic circuit to which the call is to be extended, (2) transmitting information from the test desk to the system controller specifying the equipment number of the selected circuit, and (3) placing a call to the selected circuit from the test desk.

The operation of the make-busy switch generates a potential which prevents the selected circuit from subsequently being seized for use on other calls. This insures that the circuit will remain idle and will be available to the test desk.

The reception of the equipment number by the system controller permits it to direct the operation of the switching network so that a connection is set up between the test desk network appearance and the network appearance of the selected circuit. This same equipment number information also permits the system controller and the network to ignore the make-busy signal of the selected circuit.

Although the foregoing arrangements are effective to enable test calls to be placed to specified circuits, they are less than ideal insofar as concerns ease and efficiency of operation. This is particularly true with respect to the transmission of the equipment number information to the system controller. This information is customarily transmitted from the test desk under control of setup switches which must be adjusted by a craftsman to indicate the required equipment number. This often is a burdensome task since the craftsman must first look up the equipment number of the selected circuit, and then must enter it without error into the setup switches. Both of these operations are time consuming and subject to error. If an erroneous equipment number is entered, the test call will not be directed to the correct circuit.

BRIEF SUMMARY OF THE INVENTION

Objects

It is therefore an object of the invention to provide improved facilities for extending calls from a test desk to a selected traffic circuit.

It is a further object of the invention to minimize the number of manual operations required to extend test calls to selected traffic circuits.

Summary Description

A switching system is provided in accordance with the present invention which permits calls to be extended from a test desk to any preselected traffic circuit with improved ease and efficiency. Specifically, the present invention permits a call to be completed by operating a make-busy key or jack associated with a selected circuit and by then merely placing a call to the circuit from the test desk. No setup switches or the equivalent are required. Instead, special circuitry is provided to insure that the call is automatically extended to the traffic circuit whose make-busy key is operated.

The make-busy switch of each traffic circuit is interconnected with the system controller in such a manner that a circuit whose switch is operated appears busy for all regular traffic served by the system. However, upon the initiation of a call from the test desk, special circuitry, provided by our invention, alters the state of the system so that the controller temporarily makes all nonselected traffic circuits temporarily appear busy and, at the same time, makes the selected circuit appear idle. The system controller and the network then together cooperate to extend the test desk call to the selected circuit since it is the only one that appears idle. The serving of test calls in this manner eliminates the time-consuming and burdensome step of determining and entering equipment numbers representing a selected circuit into test desk setup switches or the like.

Our invention can easily be embodied in a wired logic electronic type switching system utilizing an end-marked network. In such systems, each trunk side traffic circuit typically has a plural input selection gate, such as an AND gate, which must be switched to its select or AND state in order for the circuit to be seized for use on a call. A traffic circuit is seized by the system controller which is connected to one input of the selection gate of each circuit. A gate can turn on when it receives a signal from the controller only if all other inputs of the gate are currently in an enabled condition.

In accordance with our invention, the operation of the make-busy switch of a selected traffic circuit applies an inhibit potential to one input of its selection gate. This potential by itself prevents the gate from being turned on and thus prevents its circuit from being seized for use on regular type traffic.

Further, in accordance with our invention, the test desk has a switch which permits it to place a call in the same manner as any other line or alternatively to place a call on a "test" basis. When the test desk switch is thrown to its "test" position, it causes the controller to generate selection potentials which are of an opposite polarity from those applied during the serving of regular type traffic. Thus, the system controller normally applies an inhibit potential to one input of the selection gate of a circuit whose make-busy switch has been operated, and at the same time, applies an enable potential to the corresponding inputs of all other traffic circuits. This enable potential by itself has no effect on the other circuits and permits them to be seized for use on regular type traffic. However, the inhibit potential applied to the gate of the selected circuit makes it unavailable to other than test traffic. Subsequently, when a test call is placed, the controller reverses its normal mode of operation, applies an inhibit potential to the gates of all nonselected circuits, and applies an enable potential to the gate of the selected circuit. This permits the gate of the selected circuit to turn ON when its other inputs are enabled, and in turn, permits the circuit to be seized for use on the test call. The system controller then causes a network connection to be established between the test desk and the selected traffic circuit.

Features

A feature of this invention is the provision of circuitry responsive to the initiation of a call from a test desk for inhibiting all nonselected traffic circuits, and for applying an enable potential to a priorly selected traffic circuit so that a switching network connection may be established between the test desk and the selected circuit.

A further feature is the provision of control circuitry which applies an inhibit potential to a selected traffic circuit to make it unavailable for regular type traffic and which, when a call is placed from a test desk, removes the inhibit potential from the selected circuit and applies an inhibit potential to all other traffic circuits so that a switching network path will be established from the calling test line to the selected traffic circuit.

These and other objects and features of the invention will become apparent from a reading of the following description of the invention taken in conjunction with the drawing in which:

DRAWING

FIGS. 1A, 1B, and 1C, when arranged as shown in FIG. 1D, disclose a system embodying the invention;

GENERAL DESCRIPTION — FIGS. 1A, 1B, AND 1C

Figure 1A:
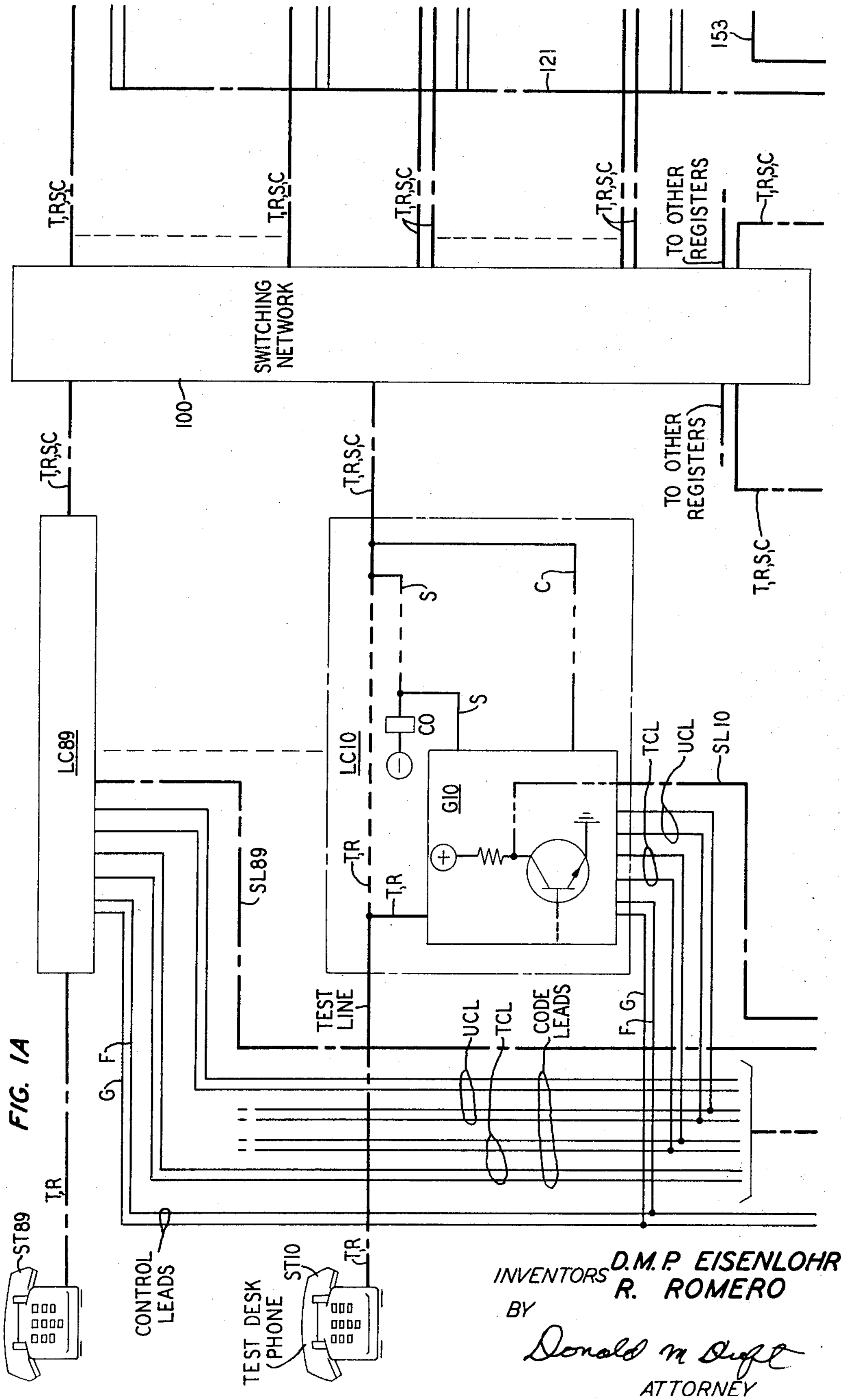

The present invention is shown embodied in the PBX disclosed in the H. H. Abbott et al., U.S. Pat. No. 3,377,432 of Apr. 9, 1968 which is hereby incorporated as part of the present specification to the same extent as if fully disclosed herein. The Abbott et al. PBX is of the wired logic electronic type, and it includes an end marked network. It further includes a plurality of PBX stations ST10 through ST89 each of which is connected to one of line circuits LC10 through LC89. Each line circuit is connected to a switching network 100 and is additionally connected to Common Control 102. Line circuit LC10 is shown in some detail and serves calls originating or terminating at test desk phone ST10. The remaining line circuits, e.g., LC11 through LC89 serve normal PBX traffic. The disclosed embodiment also includes a plurality of registers of which only one is shown in detail, i.e., 120–1, a plurality of central office trunk circuits 132–1 through **132–*n*, and a plurality of intercom trunk circuits 134–1 through 134–*n***.

The line circuits are connected to the left side (the line side) of the network; the trunk circuits are connected to the right side (the trunk side) of the network. Each register has both a line side and a trunk side appearance in order that it may be connected by the switching network 100 to one of trunk circuits 132 for an incoming call, or to one of the line circuits on intra-PBX calls. The switching network is of the end-marked type and, in response to the presence of a marking potential on each side thereof, it establishes, independently of the remainder of the system, a network interconnection between the marked terminals.

The disclosed switching system is of the common control type, in which Common Control circuit 102 governs the order in which the various circuits are interconnected by the network during the serving of each call. Common Control receives call service requests from line circuits, registers, and trunk circuits and, upon the receipt of a request, it sets its mode circuit 141 to a state unique to the request. The mode circuit and the Common Control together regulate the operation of the requesting circuit and control the establishment of a connection, via the switching network, between the requesting circuit and any circuit of the system with which it must be connected. The serving of a call may require a plurality of network connections to be established sequentially.

Each line circuit includes a transistor type gate which is selectively controlled to assume either an ON or an OFF conductive state. A gate is said to be in an ON condition whenever it receives an energizing potential at its input, and is said to be in an OFF condition when no energizing potentials are applied to it. The conductive state of a gate, such as gate G10 in line circuit LC10, is controlled by means of energizing potentials received from the G and F control leads, as well as from the tens code leads TCL and units code leads UCL. Each potential source is effective by itself to maintain a line circuit gate ON, independent of the other source. A potential is applied to the S lead and is effective at certain times to cancel the energizing potential received over the G and F leads to cause a gate to turn OFF, provided it is not at the same time receiving an energizing potential over one of the code leads. The code lead network includes a code lead combining circuit 140. This circuit isolates the outputs of the various circuits (registers 120 and scanner 106) that apply control potentials to the code leads.

Signals indicating the conductive state of each line circuit gate are transmitted over paths SL10 through SL89 to Common Control 102. These signals enable Common Control to monitor the ON and OFF state of each line circuit gate and, in turn, by means of prewired logic to determine whenever a line circuit requires action by the Common Control with regard to either a call initiated by or directed to the line circuit. Included among the functions performed by the Common Control circuit in connection with the establishment of call connections are the recognition of a service request from a calling line circuit, the identification of a calling line circuit requiring a connection to a register, the identification and selection of a called line circuit following the registration of the called number by the register, and the identification of a calling line circuit at the time it is to be connected to a called line circuit.

Common Control 102 includes a line circuit scanner 106 having a plurality of output positions which are connectable by tens code leads TCL and units code leads UCL, and by combining circuit 140, to the line circuits. Each line circuit is connected to a unique combination of four code leads. Common Control 102 also includes a gate output signal translator 108 which is connected to signal leads SL10 through SL89. This circuit translates the signals received from the line circuit gates and informs Common Control regarding the current status of the call served by each line circuit. Common Control also includes a register bid circuit 110 and a trunk bid circuit 114 which receives service request signals from registers and trunk circuits, respectively. The Common Control further includes a register and trunk selection circuit 112 whose function is to select an idle register or trunk for connection to a line circuit. Common Control 102 also includes a control circuit 104, which together with mode circuit 141, regulates and controls the operation of all circuits within the PBX.

Common Control 102 supplies an energizing potential over the G and F leads to each line circuit to hold its gate ON during the idle state of the line circuit. An off-hook condition at a calling station, such as ST10, causes off-hook detection circuitry within gate G10 to cancel this potential and to switch the gate to an OFF state. This causes a change of state signal to be transmitted over signal leads SL10 to Common Control 102 to inform it that one of the line circuits is currently requesting service.

In response to the receipt of this signal, and as described in the Abbott et al. patent, the Common Control initiates a scanning operation of all line circuits by scanner 106 via the code leads. The gate in the calling line circuit is switched ON when scanning begins and is switched OFF again when the calling line circuit is scanned. A change of state signal is transmitted over signal leads SL10 to Common Control 102 when the gate switches ON to stop the scanner in its operative position associated with the calling line circuit LC10. The operation of the system of FIGS. 1 for the serving of regular, i.e., nontest type calls, is disclosed in detail in the Abbott et al. patent. Therefore, the following sets forth only a brief summary of how such calls are served. This description is made with the assumption that the station ST10, which is served by line circuit LC10, initiates a nontest type call that is to be extended to station ST89 via line circuit LC89.

As already mentioned, the transistor gate in line circuit 10 is normally ON; it turns OFF when station 10 goes off-hook; Common Control receives this off-hook signal over signal leads SL10; turns the transistor gate back ON via the scanner code leads; and begins a line scanning operation. The transistor gate G10 turns OFF when line circuit LC10 is scanned and the resultant signal on conductor SL10 stops the scanner. Common Control now selects an idle register such as register 120–1; causes the register to mark its C lead trunk side network appearance; and causes the line circuit to mark its C lead network appearance. The network then completes a path between line circuit 10 and register 1. The register now applies a ground to the S lead to operate the CO relay in line circuit LC10. Common Control turns the transistor gate in line circuit 10 ON at this time and resets the scanner. The calling party now dials the digit 89 into the register to obtain a connection to station 89. The output of the register is gated onto the code leads to turn OFF the transistor gate in line circuit 89. The code lead potential at this time holds the transistor gates and other line circuit ON. Common Control next selects an intercom trunk such as 134–1; it causes this trunk to mark one of its C lead network appearances; and Common Control causes line circuit 89 to mark its C lead network appearance. The network now completes a path between the called line circuit LC89 and the marked network appearance of intercom trunk 134–1. The output of the register is removed from the code leads; and the transistor gates in all line circuits are held ON by a potential applied to the F lead. The register now applies a negative 24 volt call-back potential to the S lead of line circuit LC10. This turns the transistor gate of the line circuit OFF and initiates a new scanning operation. The transistor gate is turned ON at the beginning of the scanning operation and once again turns OFF when the scanner scans line circuit LC10. The register now releases; line circuit LC10 marks its C lead network appearance; and the other C lead appearance of intercom trunk 134–1 is marked by signals received from Common Control. The switching network responds to these marks and completes a connection between calling station ST10, trunk circuit 134–1, and in turn, called station ST89.

Figure 1B:
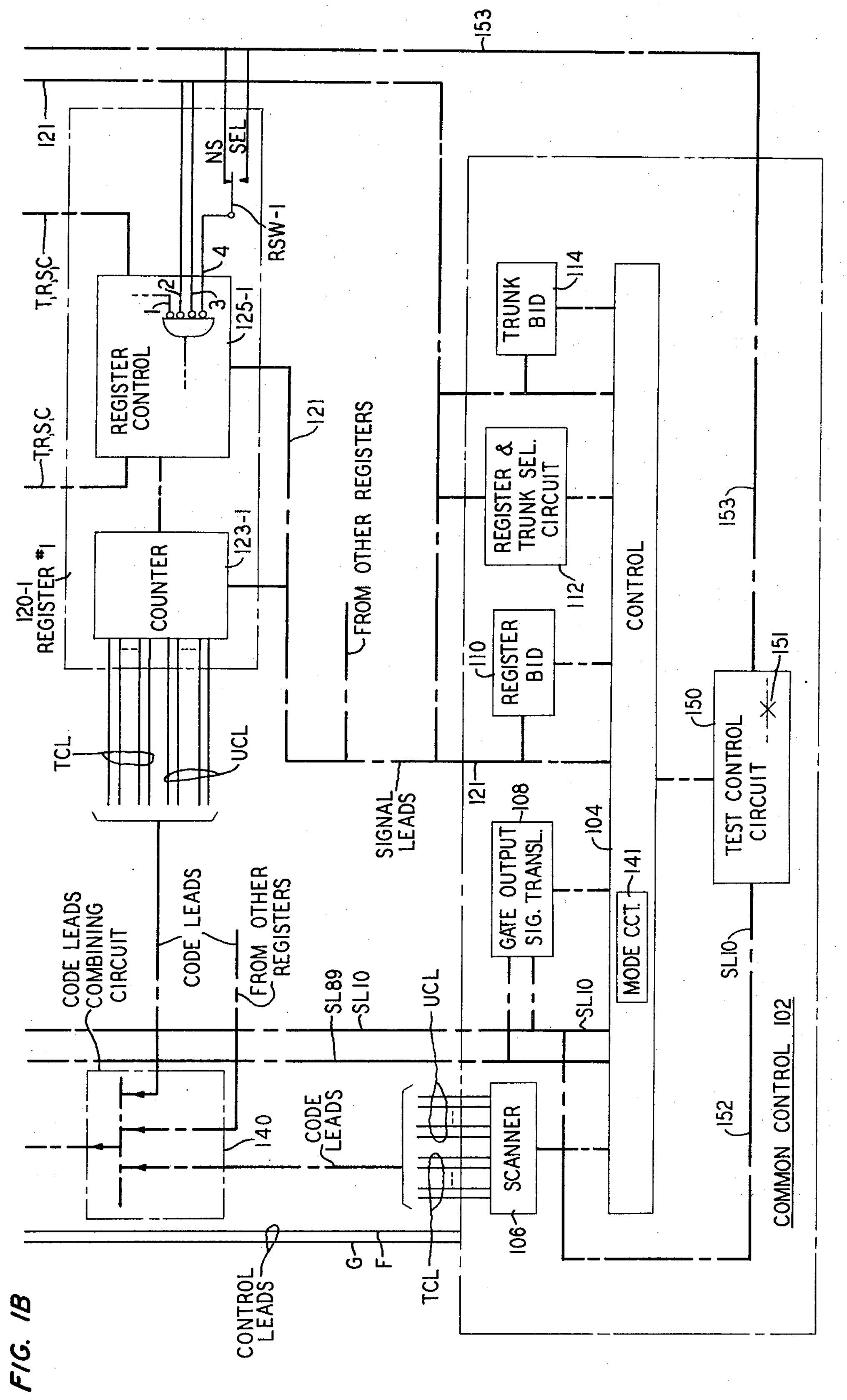
Figure 1C:
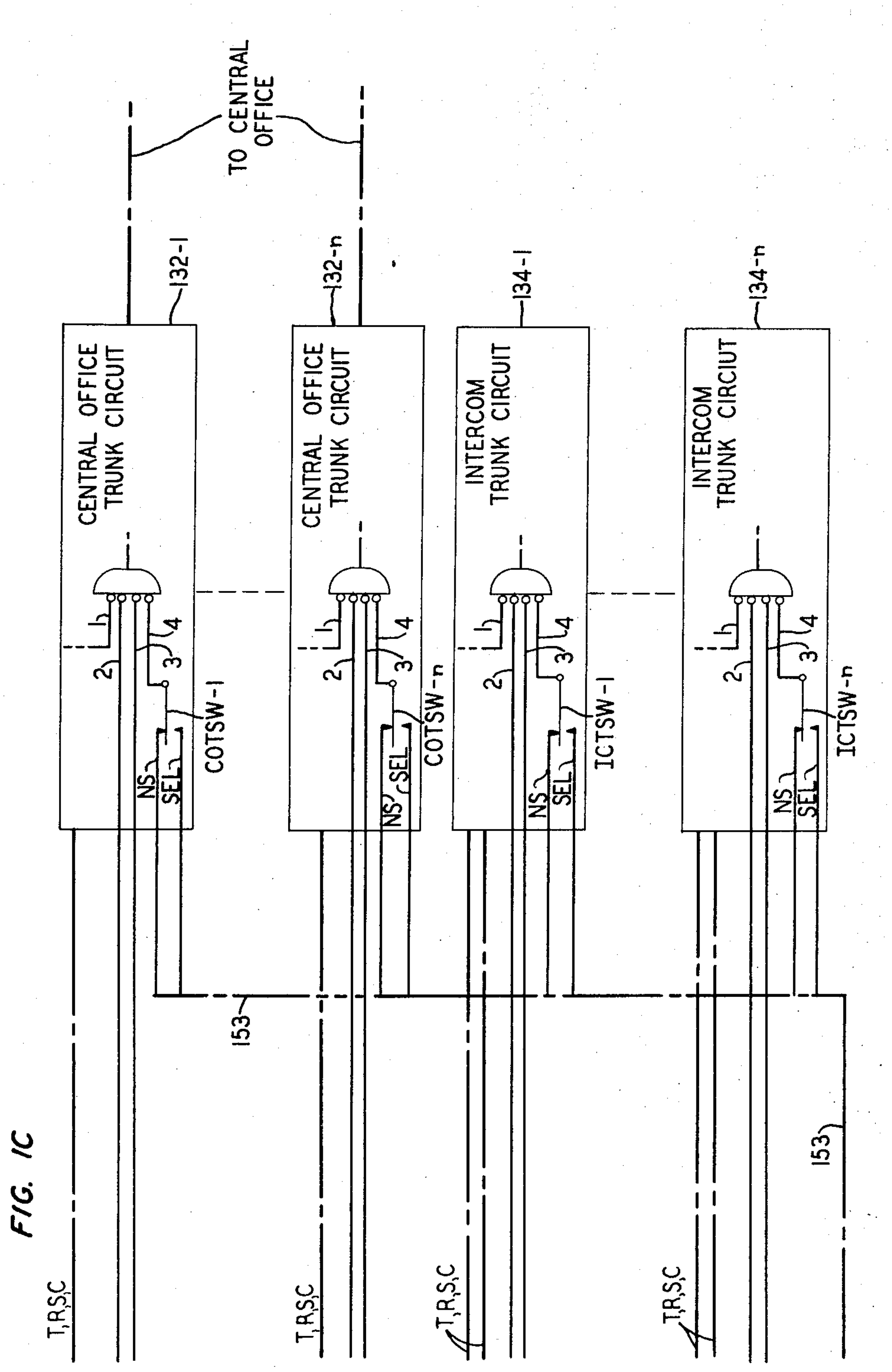
Figure 1D:
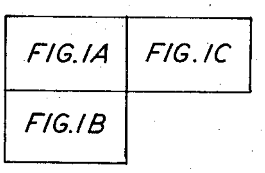

The following describes the manner in which the system of FIGS. 1A, 1B, and 1C serves a test call. It is assumed that the test call is initiated at station ST10 and is directed to a specified preselected trunk side circuit such as register 120–1. The gate signals generated by line circuit LC10 during the serving of this call are applied to signal conductors SL10. These conductors extend from gate circuit LC10 to a number of circuits in Common Control. In particular, they extend via path 152 in Common Control to the Test Control Circuit 150. This circuit contains a test switch 151 which controls the polarity of the signals applied at certain times to output conductors 153 which extend to all trunk side circuits. Each trunk side circuit contains an AND gate in its input circuitry. Each AND gate operates in such a manner that it must be switched to its OFF state in order for its circuit to be seized for use on a call.

Each AND gate has four inputs. Input No.1 is connected to supervision circuitry internal to the circuit of which the AND gate is a part. Inputs No.2 and No.3 are connected to path 121 which extends to a plurality of circuits in Common Control. The lower input of each gate, input No.4, is connected to the transfer contact of a switch, such as switch RSW–1 for register 1. The break and make contacts of the switch are connected to conductors NS and SEL, respectively of path 153 which extends from the output of the Test Control Circuit 150. The switch of each traffic circuit is normally unoperated so that the No.4 input of its AND gate is connected via the switch to conductor NS. A switch is operated to select its circuit for use on a test call. At that time, the No.4 gate input is connected by the switch to conductor SEL. The Test Control Circuit 150 normally applies an inhibit potential to conductor SEL.

When a test call is not being served, the Test Control Circuit 150 applies an enable potential to its output conductor NS of path 153. This causes a corresponding enable potential to be applied to the lower input of all trunk side AND gates. This permits the state of all AND gates to be controlled by the potentials applied to their top three inputs. The top input of each gate is enabled whenever the circuit of which it is a part is idle; inputs No.2 and No.3 are enabled by Common Control via path 121 when it seizes a particular circuit for use on a call. In summary of the description so far, the Test Control Circuit permits the system to function in its normal manner by applying an enable potential to conductor NS when a test call is not being made.

A test call is completed from the station ST10 at the test desk via line circuit LC10 to a specified register, such as register 1, by initially operating the register switch RSW–1. The operation of switch RSW–1 applies the inhibit potential on conductor SEL to the No.4 input of the register gate. This precludes the gate from being turned ON for the time being, but yet permits the register to complete the serving of any call on which it may currently be involved. Next, the craftsman at the test desk operates switch 151 and lifts his subset ST10 to initiate a call. The system responds in the manner already described; and, as signals are received from the line circuit gate via path SL10, they are extended over path 152, to the Test Control Circuit. Since switch 151 is now operated, the Test Control Circuit momentarily applies an inhibit potential to conductor NS and, at the same time, momentarily applies an enable potential to conductor SEL. Common Control now marks the C lead trunk side appearance of register 1 and the C lead appearance of calling line circuit LC10 to cause the network to complete a path between line circuit 10 and the trunk side appearance of register 1. The gate of line circuit LC10 switches its conductive state when this network path is completed; the change of state signal on path SL10 switches the state of the Test Control Circuit back to its normal condition so that the inhibit potential is removed from conductor NS and is reapplied to conductor SEL. This permits all trunk side circuits to be seized in the normal manner by subsequent regular type traffic. The craftsman now resets switch 151 to its normal state. Once the test desk obtains a connection to the desired trunk side circuit, the craftsman may then make whatever test that may be desired. The nature of the tests that are made and the manner in which they are made comprise no portion of this invention and, therefore, need no further elaboration.

Figure 2:
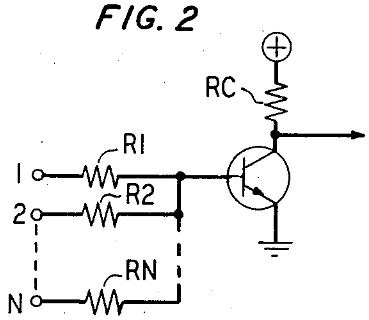
FIG. 2 illustrates the basic transistor resistor logic inverter circuit that is used extensively as both an AND and an OR gate.
Figure 3:
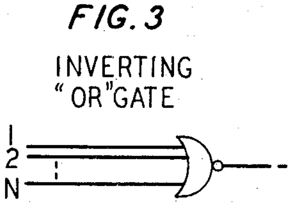
FIG. 3 illustrates the symbol used when the circuit of FIG. 2 is operated as an inverting OR gate.
Figure 4:
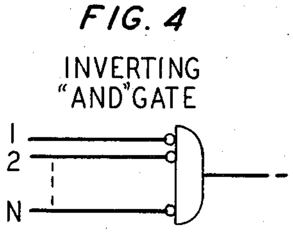
FIG. 4 illustrates the symbol used when the circuit of FIG. 2 is operated as an inverting AND gate.

Logic Circuits — FIGS. 2, 3, and 4

The disclosed system makes extensive use of transistor resistor logic circuits in which a single transistor stage is used as an inverter, an inverting AND gate, or an inverting OR gate, depending upon the nature of the input signals applied thereto and the function to be performed by the stage. FIG. 2 discloses a schematic of a circuit which comprises a single NPN transistors, a collector resistor RC and a plurality of input resistors, R1 – R*n*, of which there is one for each input. The circuit of FIG. 2 is basically a single-stage inverter since a positive going signal applied to the base appears as a negative going signal at the collector, and vice versa.

The stage may be used as an inverting OR gate by leaving the circuit normally cut off, i.e., all inputs LOW (ground). In this case, a positive going signal applied to one or more input leads will turn the transistor ON and provide a negative going signal on the collector. The stage also may be used as an inverting AND gate. In this case the transistor is normally held ON by a positive signal applied to one or more of its inputs. The AND condition of the circuit is achieved by a ground potential on all inputs. This turns the transistor OFF and produces a positive going signal at its output.

FIG. 3 discloses the symbol used when the transistor circuit of FIG. 3 is operated as an inverting OR gate; FIG. 4 discloses the symbol used when the circuit of FIG. 2 is operated as an inverting AND gate.

Figure 5C:
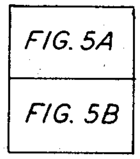
FIGS. 5A and 5B, when arranged as shown on FIG. 5C, disclose additional details of the invention beyond those shown on FIGS. 1A, 1B, and 1C.
Figure 5A:
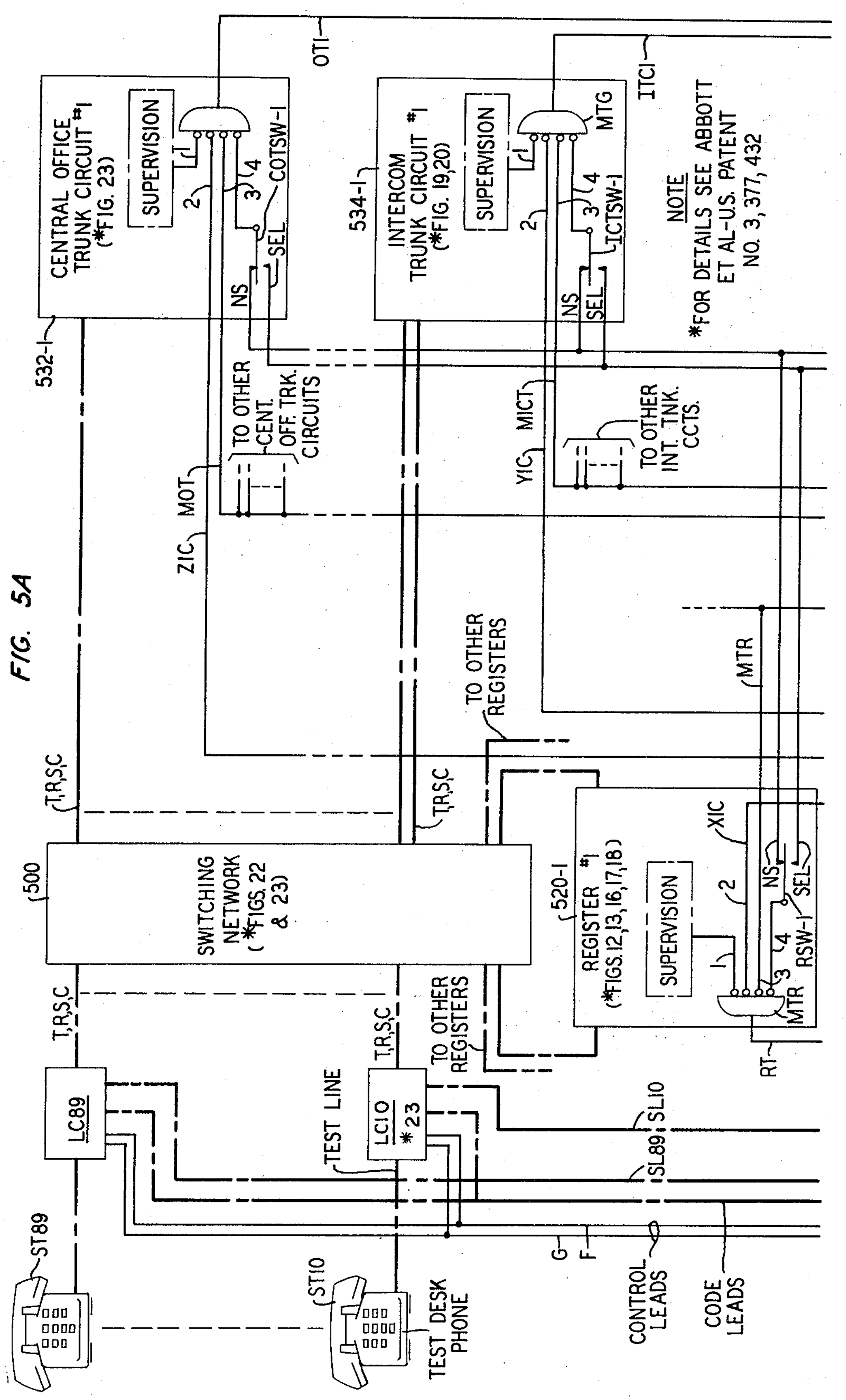
Figure 5B:
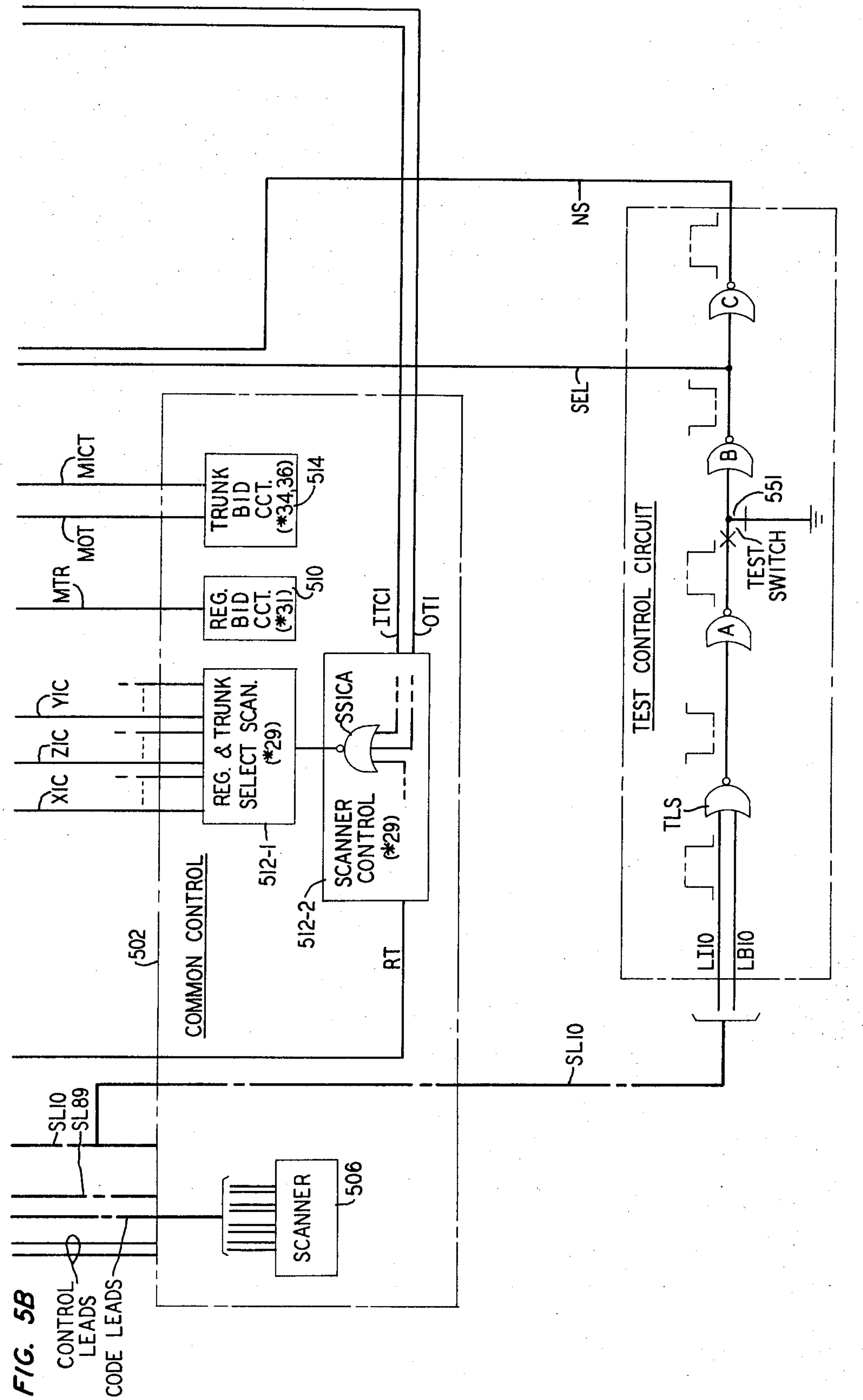

Detailed Description — FIGS. 5A and 5B

The present specification discloses and describes only so much of the Abbott et al. patent as is necessary for an understanding of our invention. The manner in which the present invention may be embodied into the Abbott et al. system is facilitated by indicating on FIGS. 5A and 5B the appropriate figure numbers of Abbott et al., on which the various equipments of FIGS. 5A and 5B may be found. Thus, for example, line circuit LC10 is shown on Abbott et al. FIG. 23; the register circuit is shown on FIGS. 12, 13, 16, 17, and 18 of Abbott et al.

FIGS. 5A and 5B together disclose further details of the circuitry and equipment that is added to the Abbott et al. system in order to extend a test call from a line side circuit to a selected trunk side circuit. The complexity of these drawing figures have been simplified by eliminating certain of the equipment and circuitry that has already been disclosed and described in connection with FIGS. 1. Also, each element on FIGS. 5 corresponding to an element on FIGS. 1 is designated in a manner that facilitates an understanding of the correspondence. Thus, network 500 on FIG. 5A corresponds to the network 100 on FIG. 1A.

FIGS. 5A and 5B disclose line circuits LC10 through LC89, and a switching network 500. They further disclose in detail only a single central office trunk circuit 532–1, a single intercom trunk circuit 534–1, and a single register circuit 520–1. The Common Control 502 contains the line scanner 506. The code leads interconnections between the line circuits, the line scanner, and the register are shown in simplified form on FIGS. 5A and 5B. The signal leads SL10 and SL89 for line circuits LC10 and LC89 are shown extending to Common Control. The register and trunk select circuit 112 of FIG. 1B is shown in further detail on FIG. 5B and may be seen to include a scanner 512–1 and a scanner control 512–2 having a gate SSICA. The output of this scanner is connected over separate conductors to the lower input of the AND gate in the register, the central office trunk circuit, and the intercom trunk circuit. The output of the AND gate of each of these circuits extends back to an input of the SSICA gate which, as subsequently described, is part of the control circuitry for the scanner. The Test Control Circuit is shown in further detail and comprises OR gate connected together in a series. It further includes test switch 551. The input of the Test Control Circuit comprises the TLS OR gate which is connected to the LI10 and LB10 conductors which together comprise the SL10 conductor path shown on both FIGS. 1 and FIGS. 5. It is this path by means of which the gate of line circuit LC10 transmits change of state signals to Common Control.

The trunk bid and register bid circuits (514 and 510) of Common Control are also shown on FIGS. 5. As may be seen, the output of each such circuit extends to an AND gate input of every circuit of the type of which it is associated. Thus, trunk bid circuit has a first output conductor, designated MICT, which extends to the No.3 input of the AND gate of each intercom trunk circuit. Similarly, the MOT output conductor of the trunk bid circuit extends to the No.3 AND gate input of each central office trunk circuit. The MTR output conductor of the register bid circuit extends to the No.3 AND gate input of each register. These circuits operate in such a manner that if, for example, a register is to be seized, the register bid circuit applies an enable potential to the MTR conductor. This enables the No.3 input of the MTR AND gate of each register to which this conductor is connected. As is subsequently described, the application of this enable potential is the first step by which Common Control seizes and selects a trunk side circuit.

The Register and Trunk Select Scanner 512–1 basically comprises a counter having an operative position individual to each trunk side circuit. Each position is individual to a different trunk side circuit, and each position has an output conductor which extends from the scanner to an AND gate input of the trunk side circuit with which the scanner position is associated. Three such output conductors are shown on FIGS. 5. Thus, conductor XIC extends from the scanner to the No.2 input of the MTR register gate, conductor ZIC extends from the scanner to the No.2 AND gate input of central office trunk circuit 532–1, and conductor YIC extends from the scanner output to the No.2 input of the MTG AND gate of the intercom trunk circuit.

The scanner operates in such a manner that it applies an inhibit potential to all of its output conductors during its idle state; and when it initiates a scanning operation, it sequentially steps through its counting positions and in so doing sequentially applies an enable potential to its output conductors one at a time. In other words, when a particular trunk side circuit is scanned, its No.2 AND gate input is then enabled, but at all other times, its No.2 input is inhibited by the scanner.

A trunk side circuit is seized by switching its gate to its AND state. This can occur only when all inputs of the gate concurrently receive an enable potential. An inhibit potential on one or more inputs of a gate will preclude it from switching to its AND state and, in turn, will preclude its trunk side circuit from being seized. The No.1 input of the AND gate trunk side circuit is extended to a box designated "Supervision." This represents the circuitry internal to each trunk side circuit which indicates whether the circuit is currently busy, i.e., engaged in a call, or alternatively is idle. The supervision equipment in each trunk side circuit applies an inhibit potential to its No.1 AND gate input when its circuit is busy and, alternatively, applies an enable potential when its circuit is idle.

The output of the Test Control Circuit comprises the SEL (select) and NS (nonselect) conductors. These conductors extend to all trunk side circuits where they are connected by means of make-busy select switches to the No.4 input of the AND gate in each such circuit. Thus, the register make-busy switch is designated RSW–1; its swinger or transfer contact is connected to the No.1 input of AND gate MTR. The break and make contacts of this switch are connected to the NS and SEL output conductors, respectively.

The Test Control Circuit includes test switch 551 which is normally in a nonoperated state and which then applies a ground to the input of the B OR gate. Since the OR gate is of the inverting type, this holds the output of the gate high, the input of the C gate high, and the output of the C gate low. The output of the C gate is connected to the NS conductor; the input of the C gate is connected to the SEL conductor. The test switch remains unoperated at all times except when a test call is being made. Thus, during the normal state of the system, the output of the C gate is low, and this low is extended over the NS conductor via the break contacts of the make-busy switch in each trunk side circuit to the No.4 input of its AND gate. As already described, a low constitutes an enable potential. Thus, the low supplied to the No.4 input of all AND gates may be said to have no effect since it permits each trunk side circuit to be seized under control of the potentials applied to the other AND gate inputs.

Extension of a Test Call to a Selected Register

Let it be assumed that a craftsman at subset ST10 desires to obtain a connection to a selected trunk side circuit such as, for example, register 520–1 whose details are shown on FIG. 5. In order to obtain this connection, the craftsman first operates the make-busy switch of the register, switch RSW–1. This transfers the No.4 input of AND gate MTR from the NS to the SEL conductor. Conductor SEL is normally at a high or an inhibit potential. This potential on the No.4 input of AND gate MTR prevents the gate from being switched to its AND state and, thereby, makes the register busy to any subsequently initiated calls. However, the register may continue to serve any call with which it may be currently engaged. Next, the craftsman operates the test switch 551 within the Test Control Circuit. This transfers the input of the B gate from ground to the output of gate A. However, this causes no change of state of gates B and C since the output of the A gate is normally at a low or ground potential as indicated by the waveform on FIG. 5B. After having operated the test switch, the craftsman lifts the handset of the test desk telephone ST10. This initiates the circuit operation within line circuit LC10 to switch the transistor gate from an ON to an OFF state. The LI10 conductor receives the output signal generated by the transistor gate and then subset ST10 goes off-hook. The potential on conductor LI10 rises from a low to a high as indicated by the waveform adjacent the input of the TLS OR gate. The input of the TLS OR gate going high drives its output low extending to the input of gate A. This drives the output of gate A high. The output of gate A going high drives the output of gate B low and the output of gate C high. The output of gate C is connected to the NS conductor extending via the unoperated make-busy contacts of each nonselected trunk side circuit to the No.4 input of the AND gate in each such circuit. The high on this conductor, therefore, inhibits the AND gates of all nonselected trunk side circuits. In other words, it inhibits all trunk side circuits other than register 520–1 which has been selected by the craftsman. The low on the input of the C gate is connected to the SEL conductor which extends via the operated make-busy switch RSW–1 of the register to the No.4 input of its AND gate. This enable potential now permits gate MTR to be turned ON under control of its other inputs.

As described in the Abbott et al. patent, Common Control responds to the off-hook change of state signal on conductor SL10, it initiates a line scanning operation to detect the line circuit that is requesting service, it stops the line scanner when the gate is identified, and it initiates the circuit operations required to select an idle register. In performing this function, Common Control first causes the register bid circuit to apply an enable potential to conductor MTR' extending to the No.2 input of each register AND gate. At the same time, the Common Control initiates the operation of the register and trunk select scanner 512–1. This scanner operates in a manner analogous to the line circuit scanner and, in response to a start signal from Common Control, it sequentially steps through its counting positions, sequentially applies a low enable potential to its output conductors consecutively to scan the various trunk side circuits, and it continues its scanning operation until it receives a stop-scan signal from gate SSICA. The No.4 input of the AND gate of each trunk side circuit other than register 1 is currently inhibited and, thus, the scanning of each trunk side circuit other than register 1 produces no change in its AND gate. When the scanner reaches the scan position associated with register 1, it applies an enable potential over conductor XIC to the MTR gate of the register. The gate now turns ON and switches to its AND state, provided the register is idle. The MTR gate can turn ON at this time since an enable signal is now applied to all of its inputs. The No.1 input of the gate receives an enable potential from the register supervision circuit, the No.2 input receives an enable potential from the scanner, the No.3 input receives an enable potential from the register bid circuit via conductor MTR', and the No.4 input receives an enable potential via its operated make-busy switch and conductor SEL which is held low at this time under control of the potential applied to conductor LI10 by line circuit LC10.

The switching of gate MTR to its AND state applies a signal over conductor RT extending to the input of gate SSICA. This input switches the state of gate SSICA and transmits a stop signal to the scanner 512–1 to halt the trunk side circuit scanning operation.

As described in the Abbott et al., patent, the Common Control now causes the line circuit LC10 to apply a marking potential to its C conductor network appearance, and causes the register 1 to apply a marking potential to the C conductor of its trunk side appearance. In response to these two marking potentials, the end marked switching network establishes the desired connection between line circuit LC10 and the trunk side of the appearance of register 1. As soon as the register is seized by the test line circuit, its supervision equipment applies an inhibit potential to conductor BBY extending to the No.1 input of AND gate MTR to inhibit it so that the register will be unavailable for any subsequently initiated calls. When the craftsman has obtained the connection to the register, he releases the test switch 551 within the Test Control Circuit to restore the remainder of the system to normal so that it may then proceed to serve normal PBX traffic. The craftsman now may perform whatever tests that may be required.

Extension of a Call to a Selected Central Office Trunk Circuit

The preceding has described the manner in which a test line may obtain a network connection to a selected register. A connection may be obtained to a selected central office trunk circuit in much the same manner. In order to obtain such a connection, the craftsman operates the make-busy switch of the selected intercom trunk circuit, picks up his subset, and obtains a connection to any idle register. He then operates the test switch 551 within the Test Control Circuit and dials the digits required to obtain a connection to a central office trunk. Since the make-busy switch COTSW–1 of the trunk circuit 532–1 is operated, it is selected for use on the call by the Test Control Circuit in the same manner as already described for the selection of a specified register.

Extension of a Call to a Selected Intercom Trunk Circuit

A connection is established to a selected intercom trunk circuit by a procedure that varies slightly from that already described for the registers and central office trunk circuit. To reserve and establish a connection to a selected intercom trunk circuit, the craftsman first operates the make-busy switch of the selected circuit, such as for example, ICTSW–1 for the intercom trunk circuit 534–1. The operation of this switch applies an inhibit potential to the No.4 input of its MTG gate and thereby makes the circuit busy for a regular type traffic as already described for calls to a selected register. Next, the craftsman goes to any other line within the PBX, lifts the subset of the line to initiate a call, and obtains a connection to a register. After dial tone is returned by the register, the craftsman operates the test switch 551. This has no effect immediately on the output potential applied to the NS and SEL conductors since the output of gate A is at ground potential when the switch is operated. The craftsman then dials the extension number of his test line ST10. The dialed digits are entered into the register, and then applied to the code leads to select test line LC10. As described in the Abbott et al., patent, the reading out of the register contents to the code leads turns off the transistor gate within line circuit LC10 which, in turn, applies a high potential to conductor LI10 extending to the input of the TLS OR gate. This inverts the potentials applied to the NS and SEL output conductors so that the intercom trunk circuit whose make-busy switch is operated receives an enable potential on its No.1 input of its AND gate; the No.1 inputs for all other trunk side AND gates now receive an inhibit potential from the NS conductor via their normal make-busy switches. At this time, Common Control applies an enable potential to the MICT conductor extending to all intercom trunk circuits, starts the operation of the register and trunk select scanner which begins a scanning operation that continues until the scanner encounters the selected intercom trunk circuit. At that time, all inputs of its gate MTG are enabled, the gate switches to its AND state, applies an output signal to OR gate SSICA which, in turn, generates a signal to stop scanner 512–1. The supervision circuit now makes the intercom trunk circuit busy by applying an inhibit potential to the No.1 input of its AND gate. Common Control now causes the called line circuit, namely test line circuit LC10, to mark its C lead network appearance; the Common Control also causes the selected intercom trunk circuit to mark one of its trunk side C lead network appearances. In response to these two marks, the switching network completes a path between test line circuit LC10 and the selected intercom trunk circuit. Next, as described in the Abbott et al. patent, Common Control causes the calling line circuit LC89 to mark its C lead on the network, and further causes the selected trunk circuit to mark its other C lead network appearance. The register is now released from called line circuit LC10 and a network connection is established between calling line circuit LC89 and the second network appearance of the selected intercom trunk circuit. Once having obtained this connection, the craftsman may then perform whatever tests that may be desired.

What is claimed is:

1. In a switching system, a switching network having a first and a second side, a plurality of subscriber line circuits each of which is connected to an individual appearance on said first side of said network, a test line circuit connected to an individual appearance on said first side, a plurality of traffic circuits each of which is connected to an individual appearance on said second side of said network, control means for applying a make busy potential to any selected one of said traffic circuits to make said selected circuit busy to calls originated by said subscriber line circuits, means responsive to the origination of a call by said test line circuit for removing said make busy potential from said selected traffic circuit and for simultaneously applying a make busy potential to all others of said traffic circuits, and means responsive to said last-named means for establishing a network connection between said test line circuit and said selected traffic circuit.

2. In a switching system, a switching network having a first and a second side, a plurality of subscriber line circuits each of which is connected to an individual appearance on said first side of said network, a test line circuit connected to an individual appearance on said first side, a plurality of traffic circuits each of which is connected to an individual appearance on said second side of said network, a plurality of switches each of which is individual to a different one of said traffic circuits, means effective upon the operation of the switch of any selected one of said traffic circuits for applying a make busy potential to said selected circuit to make it busy to calls from said subscriber line circuits, control means responsive to the origination of a call from said test line circuit for removing said make busy potential from said selected traffic circuit and for simultaneously applying a make busy potential to all others of said traffic circuits, and means responsive to said last-named means for establishing a network connection between said test line circuit and said selected traffic circuit.

3. The system of claim 2 in which said last-named means comprises:

a scanner responsive to the initiation of said call from said test line circuit for scanning said traffic circuits to determine their availability for serving said call, and means responsive to the scanning of said selected circuit for generating an idle signal to indicate the availability of said selected circuit.

4. The invention of claim 3 in combination with means responsive to said idle signal for stopping said scanner in an operative position unique to said selected circuit, and means responsive to the stopping of said scanner for generating control signals indicating the circuits that are to be connected by said network.

5. In a switching system, a switching network having a first and a second side, a plurality of subscriber line circuits each of which is connected to an individual appearance on said first side of said network, a test line circuit connected to an individual appearance on said first side, a plurality of groups of different types of traffic circuits with each circuit being connected to an individual appearance on said second side of said network, a switch on each of said traffic circuits, means effective upon the operation of the switch of any selected traffic circuit for applying a make busy potential to said selected circuit to make it busy to subsequently originated calls from said subscriber line circuits, control means responsive to the origination of a call by said test line circuit for removing said make busy potential from said selected traffic circuit and for simultaneously applying a make busy potential to all others of said traffic circuits, means further responsive to the origination of said call by said test line for applying an enable potential to only the circuits of the group containing said selected circuit, and means responsive to said last-named means for establishing a network connection between said test line circuit and said selected traffic circuit.

6. The system of claim 5 in which said last-named means comprises:

a scanner responsive to the initiation of said call from said test line circuit for scanning said traffic circuits to determine their availability for serving said call, and means responsive to the scanning of said selected circuit for generating an idle signal to indicate the availability of said selected circuit.

7. The invention of claim 6 in combination with means responsive to said idle signal for stopping said scanner in an operative position unique to said selected circuit, and means responsive to the stopping of said scanner for generating control signals indicating the circuits that are to be connected by said network.

* * * * *